United States Patent [19]
Bernstein

[11] Patent Number: 5,146,435
[45] Date of Patent: Sep. 8, 1992

[54] ACOUSTIC TRANSDUCER

[75] Inventor: Jonathan J. Bernstein, Medfield, Mass.

[73] Assignee: The Charles Stark Draper Laboratory, Inc., Cambridge, Mass.

[21] Appl. No.: 444,996

[22] Filed: Dec. 4, 1989

[51] Int. Cl.⁵ .......................................... H04R 19/00
[52] U.S. Cl. .................................. 367/181; 381/174; 381/191; 29/29.42
[58] Field of Search ................ 367/181; 381/174, 191; 29/25.42

[56] References Cited

U.S. PATENT DOCUMENTS

| | | | |
|---|---|---|---|
| 3,838,684 | 10/1974 | Manuel et al. | 73/398 |
| 4,598,585 | 7/1986 | Boxenhorn | 73/517 R |
| 4,628,740 | 12/1986 | Ueda et al. | 73/705 |
| 4,776,019 | 10/1988 | Miyatake | 381/174 |
| 4,825,335 | 4/1989 | Wilner | 361/283 |
| 4,908,805 | 3/1990 | Sprenkels et al. | 367/181 |
| 4,922,471 | 5/1990 | Kuehnel | 367/181 |

Primary Examiner—J. W. Eldred
Attorney, Agent, or Firm—Iandiorio & Dingman

[57] ABSTRACT

An acoustic transducer includes a perforated capacitor plate; a movable capacitor plate spaced from the perforated plate; springs for movably supporting the movable capacitor plate relative to the perforated plate; and a support structure for supporting the perforated and movable plates, where the movable plate is interconnected to the support structure by the springs and where the plates, springs and support structure form a unified, monolithic structure. The movable plate, springs and support structure are made from a silicon wafer. The transducer also includes a dielectric fluid in the space between the plates; and equipment for applying an electric field across the plates for producing an output signal representative of the variation in capacitance induced by the variation in space between the plates in response to an acoustic signal.

30 Claims, 6 Drawing Sheets

ACOUSTIC TRANSDUCER

FIELD OF INVENTION

This invention relates to an acoustic transducer for sensing sonic, subsonic and ultrasonic acoustic waves in a fluid, and more particularly to such a transducer which senses acoustic energy by its effect on a movable capacitor plate.

BACKGROUND OF INVENTION

Conventional devices for sensing sonic, subsonic and ultrasonic acoustic waves in a fluid medium, i.e. liquid or gas, include piezoelectric materials, ferroelectric ceramics, fiber optic sensors, electromagnetic (moving coil) sensors, condenser and electret sensors and magnetostrictive transducers. Such devices are difficult to miniaturize and/or use materials which are incompatible with silicon processing and so may not be fabricated using silicon chip technology. At best, a hybrid device can be achieved. Further, implementation on an integrated circuit chip is not practical. The devices are typically fabricated using discrete elements which are relatively large and expensive to make and cannot generally be integrated with the electronics on a single chip. The cabling required for electrical connection between the discrete elements, e.g. transducer and buffer electronics introduces stray capacitance and attendant noise. These devices are also sensitive to acceleration forces and subject to substantial low-frequency (1/f) noise from the buffer electronics. Certain of these devices, including the ferroelectric ceramic devices, show under the influence of time, pressure and temperature.

SUMMARY OF INVENTION

It is therefore an object of this invention to provide an improved acoustic transducer for sensing sonic, subsonic and ultrasonic acoustic waves in a fluid.

It is a further object of this invention to provide such a transducer which is easily miniaturized.

It is a further object of this invention to provide such a transducer which is equally effective for microphones and hydrophones.

It is a further object of this invention to provide such a transducer which is readily adaptable for fabrication using silicon technology.

It is a further object of this invention to provide such a transducer which may be fabricated as a part of an integrated circuit chip which may contain the associated buffer electronics.

It is a further object of this invention to provide such a transducer which is reliably, accurately, and repeatably fabricatable.

It is a further object of this invention to provide such a transducer which is constructable without hybrid interconnects or cabling.

It is a further object of this invention to provide such a transducer which reduces noise introduced by stray capacitance associated with cabling.

It is a further object of this invention to provide such a transducer which does not degrade with time, temperature or pressure.

It is a further object of this invention to provide such a transducer which may be constructed using micromachining photolithographic techniques.

It is a further object of this invention to provide such a transducer which has reduced sensitivity to acceleration forces.

It is a further object of this invention to provide such a transducer which is compatible with low 1/f-noise circuitry.

The invention results from the realization that a truly reliable, repeatable, accurate, low-noise, miniaturized acoustic transducer may be made by micromachining photolithographic techniques utilizing a movable plate capacitor whose capacitance varies as a function of the incident acoustic wave energy.

This invention features an acoustic transducer having a perforated capacitor plate means and a movable capacitor plate means spaced from the perforated plate means; there are spring means for movably supporting the movable capacitor plate means relative to the perforated plate means. A dielectric fluid is disposed in the space between the plate means. There are means for applying an electric field across the plate means for producing an output signal representative of the variation in capacitance induced by the variation in the space between the plates in response to an acoustic signal.

In a preferred embodiment, the movable plate means is supported from the perforated plate means by the spring means. There may be further provided support means; the perforated plate means may be supported by the support means and the movable plate means may be interconnected to the support means by the spring means. The perforations may constitute approximately thirty percent or more of the perforated plate means. The perforations may be holes or slots. The spring means and the movable plate means may be formed of the same material and they may be integral. The dielectric fluid may be a gaseous medium such as air, or it may be a liquid. The dielectric fluid may have a specific gravity similar to that of the movable plate means to dampen acceleration forces. The support means may include a chamber. The chamber may have an opening. The plate means may be disposed across the opening with one of the plate means facing into the chamber and the other facing out. The chamber may be filled with the same dielectric fluid as is present in the space between the plate means. The movable plate means may move translationally relative to the perforated plate means, or rotationally. There may be a second perforated plate means on the opposite side of the movable plate means from the first perforated plate means and spaced from the movable plate means with a dielectric fluid between them. The means for applying an electric field may apply an electric field across the second perforated plate means and the movable plate means. The applied electric field may be of one polarity on the first perforated plate and of the opposite polarity on the other perforated plate. The movable plate may be held at a virtual ground. A flexible membrane may cover the plate means facing out of the chamber. The movable plate means may include a pressure equalization path through the plate interconnecting the opposite faces. That path may include a perimetrical slot. The perforated plate means may include strain relief means. The strain relief means may be slots. The means for applying an electric field may include a local oscillator circuit for providing a carrier wave across the plate means. There may be means for amplifying the carrier wave modulated by variations introduced by variations of the space between the plate means, and there may be means for demodulating the carrier wave to obtain the modulating variations in spacing of the plate means representative of the change in capacitance effected by incident acoustic wave energy.

DISCLOSURE OF PREFERRED EMBODIMENT

Other objects, features and advantages will occur to those skilled in the art from the following description of a preferred embodiment and the accompanying drawings, in which.

Figure 1:
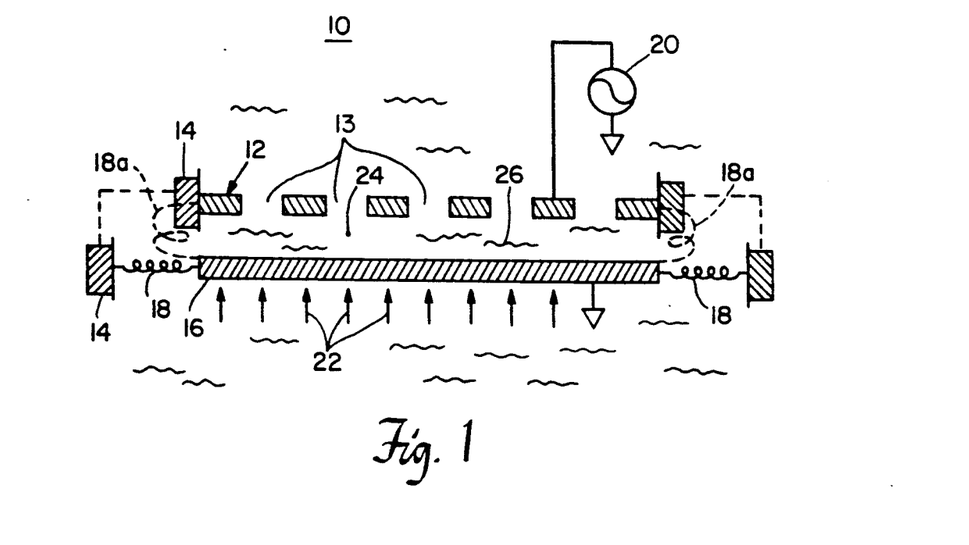
FIG. 1 is a schematic diagram of an acoustic transducer according to this invention.

There is shown in FIG. 1 an acoustic transducer 10 according to this invention which includes a perforated plate 12 having perforations 13 mounted to frame 14 and a movable plate 16 mounted to frame 14 by springs 18. Alternatively, movable plate 16 may be interconnected directly to perforated plate 12 by means of springs 18a. An electric field is applied across perforated plate 12 to grounded movable plate 16 by AC signal source 20. In operation, when acoustic wave energy, arrows 22, is incident on movable plate 16, plate 16 is urged closer to perforated plate 12. This changes the overall capacitance of the two plates in the electrical field provided by AC signal generator 20. The change in capacitance provides a variation or modulation of the signal provided by signal generator 20 and this can be detected as a representation of the incident acoustic wave energy. The spare 24 between plates 12 and 16 is filled with a dielectric fluid 26. Since the capacitance of the device is proportional to the dielectric constant of the fluid 26 in space 24, the higher the dielectric constant the better will be the signal obtained. If the device is operated as a microphone the dielectric fluid will typically be air. If it is a hydrophone, any non-conductive fluid will do. If the specific gravity of the fluid is matched to that of the movable plate, then errors due to motion of the plate in response to acceleration forces will be minimized.

In a preferred construction, the frame or support 14 as well as the springs 18 and plates 12 and 16, are all made of silicon. The dielectric fluid 26 may be ethanol, methanol, freon, oil, or any other high dielectric material. Typically the transducer is conductive. By micromachining photolithographic processes, the silicon areas to be protected during etching are doped with boron; an etchant such as EDP is used.

Figure 2:
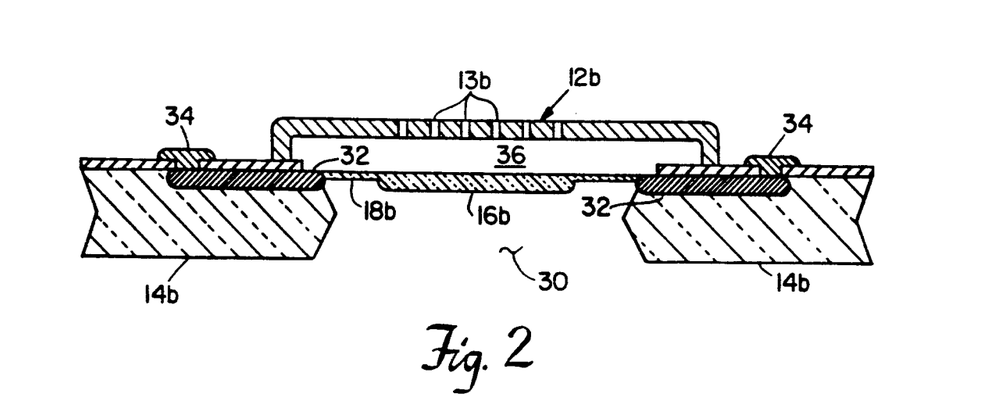
FIG. 2 is a cross-sectional diagrammatic view of an implementation of the transducer of FIG. 1.

In one implementation the support or frame 14, FIG. 2, is a silicon wafer. Springs 18b are also silicon, as is the movable plate 16b. An opening 30 is etched in silicon support wafer 14b. Springs 18b are supported by boron diffusion regions 32 on support wafer 14b. Metal contacts 34 extend through the dielectric coating such as silicon dioxide or silicon nitride for electrical connection with external circuitry. Perforated plate 12b is made in the form of a hollow bridge member which forms a hollow cavity 36 over movable plate 16b.

Figure 3:
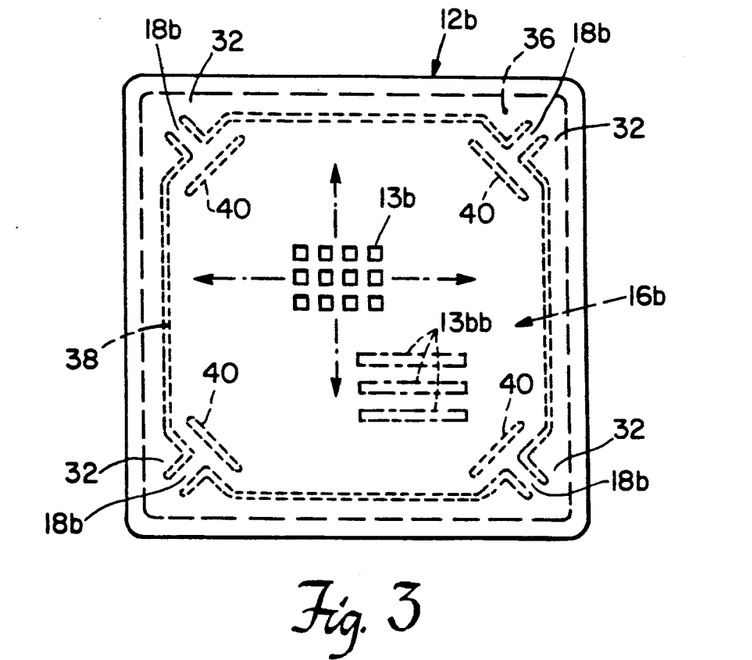
FIG. 3 is a top view of a portion of the transducer as shown in FIG. 2.
Figure 4:
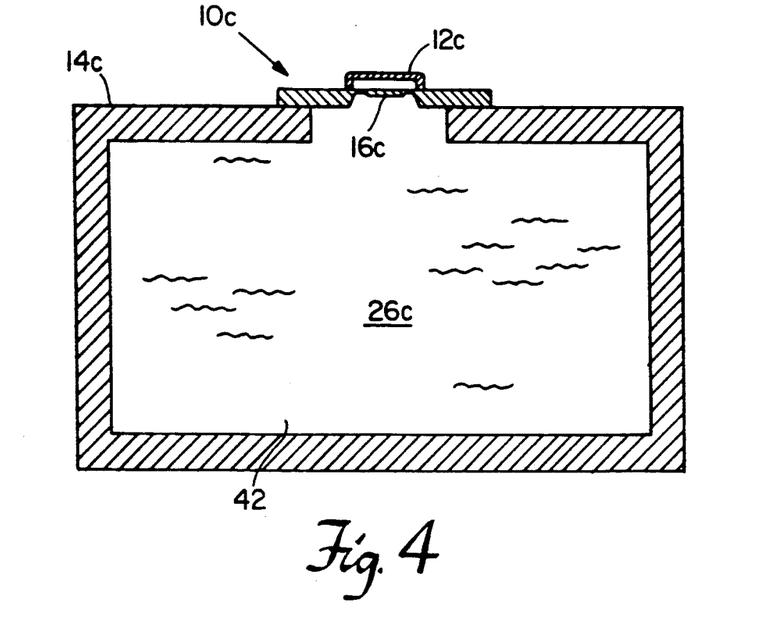
FIG. 4 is a simplified diagram showing the transducer according to this invention mounted within a cavity in the microphone or hydrophone.

Perforations 13b, FIG. 3, may extend over as much as thirty percent or more of the surface of perforated plate 12b. They may be holes 13b or slots 13bb, or any other suitable form of passage. Their purpose is to permit the dielectric fluid to move easily in and out through them without creating backpressure that would interfere with the proper variation of the capacitance in response to incident acoustic wave energy. Movable plate 16b is integral with springs 18b which are in turn integral with boron diffusion regions 32. A pressure equalizing passage in the form of a partially perimetrical slot 38 is provided in movable plate 16b in order to permit any changes in pressure in the medium in which the transducer is immersed, e.g. air, water, to equalize on both sides of plate 16b. Movable plate 16b may also include strain relief features such as slots 40 to reduce the strain in plate 16b occasioned by the fabrication process. Slots 40 were made approximately 0.5 microns in width where the sensitivity is to extend down to about 1 Hz. Larger slots may be used for higher frequencies. The entire transducer may have a volume of approximately 1 mm$^3$. It is preferably associated with a cavity whose volume is typically 1 cm$^3$ and is filled with a fluid, typically the same fluid as is used for the dielectric fluid between the plates 12 and 16. Such a cavity is shown in FIG. 4, where the frame or support structure 14c has been enlarged to create a cavity or chamber 42 in which the dielectric fluid 26c resides. Use of chamber 42 dramatically improves the performance of transducer 10. Ideally the compliance of the cavity or chamber is the same as or at least the same order of magnitude as the spring compliance of springs 18.

Figure 5:
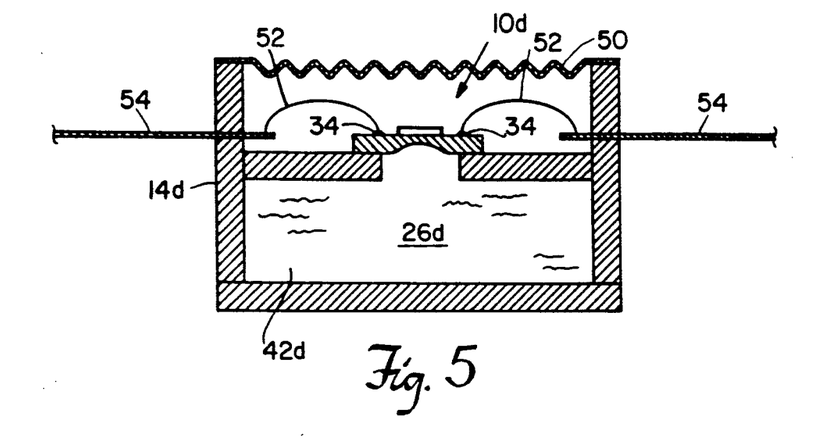
FIG. 5 is a simplified schematic diagram of a transducer according to this invention packaged for use as a hydrophone.

When used as a hydrophone, frame or support 14d, FIG. 5, including cavity or chamber 42d, may be closed by titanium membrane 50 in order to protect the transducer. Electrical connection to the outside world is from contacts 34 via bond wires 52 to conductors 54.

Figure 6:
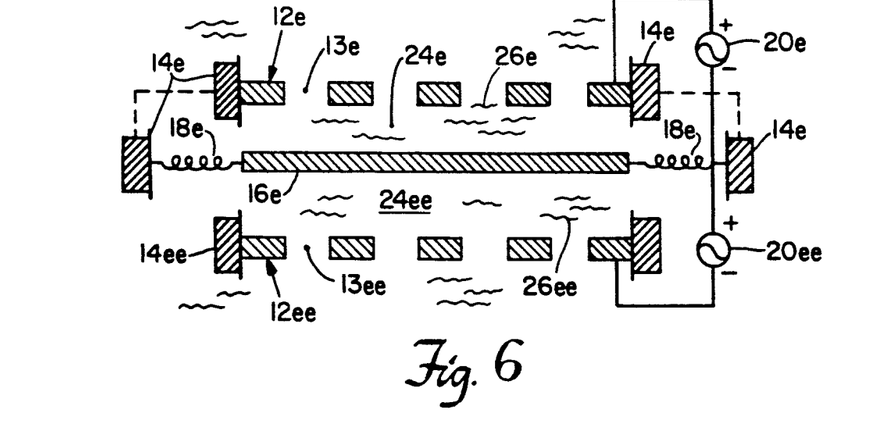
FIG. 6 is a schematic diagram similar to that of FIG. 1 employing two perforated plate means.
Figure 7:
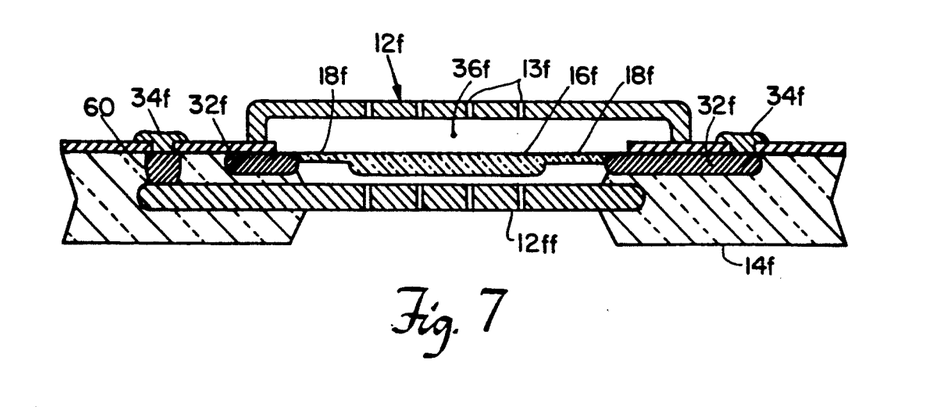
FIG. 7 is a cross-sectional diagrammatic view of an implementation of the device of FIG. 6.

In an alternative embodiment, a second perforated plate 12ee, FIG. 6, may be added on the other side of movable plate 16e from the first perforated plate 12e. In addition to increasing the deflection signal, the two perforated plates now act as mechanical stops to prevent rupture of the movable plate 16e by a sudden, intense, pulse of acoustic wave energy. A second alternating current signal source 20ee is added and the voltages are arranged so there is a positive voltage on perforated plate 12e and there is a negative voltage on perforated plate 12ee. Movable plate 16e may be arranged with a center tap or may be at a virtual ground. The three-electrode device of FIG. 6 may be implemented as shown in FIG. 7 in the same way as the two-electrode device of FIG. 1 was implemented by the device as illustrated in FIG. 2, that is, using silicon technology with boron-doped silicon in a micromachining photolithographic process. A totally chip-compatible silicon construction can be effected including the second perforated electrode 12ff, FIG. 7, which is connected through a boron diffusion region 60 to contact 34f.

Figure 8:
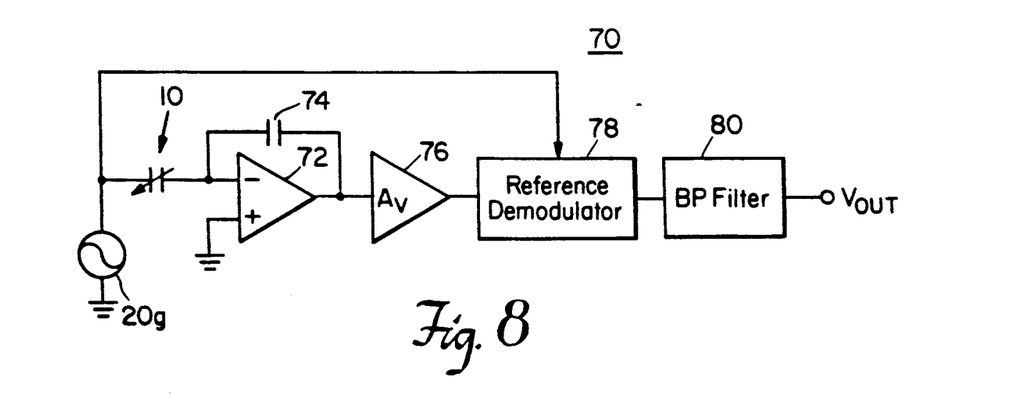
FIG. 8 is a detection circuit for use with the acoustic transducer according to this invention.

Transducer 10 may be employed in a detection circuit 70, FIG. 8, in which the AC signal generator 20g operates as a local oscillator at for example 100 kilocycles or more. Then variations in the capacitance of transducer 10 causes modulation of the 100 KHz carrier wave. Amplifier 72 with feedback impedance 74 amplifies the modulated carrier signal in the 100 KHz band. After further amplification in amplifier 76, the signal is synchronously demodulated in demodulator 78 using a reference signal derived from AC signal generator 20g to extract the modulating signal representing the capacitance fluctuation of transducer 10. The detected signal representative of the variation in capacitance and thus the strength of the incident acoustic wave energy may be further treated in bandpass filter 80 to remove any DC component.

Figure 9:
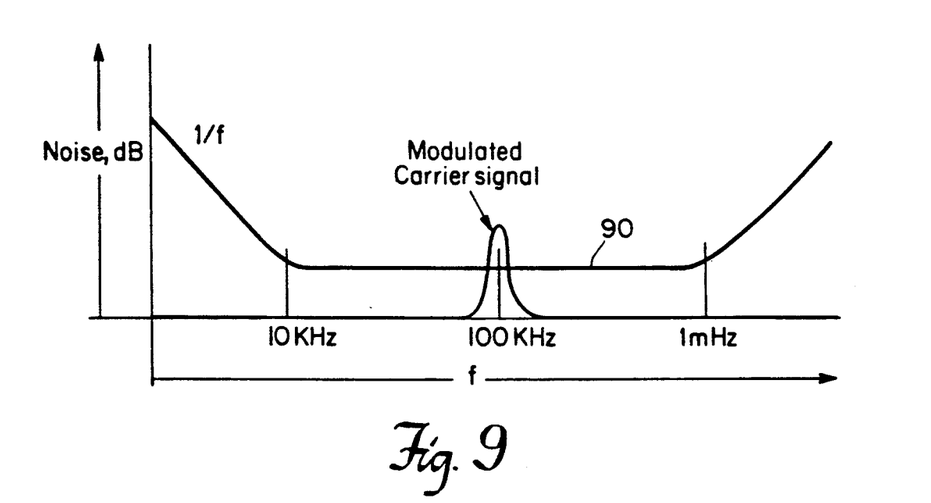
FIG. 9 is a simplified illustration of the noise variation with frequency.

By operating in the range of 100 KHz or more, the amplifiers are functioning in the low-noise region 90, FIG. 9, far removed from the "1/f" region of higher noise, below 10 KHz. Subsequently, after the preamplification has raised the signal to a sufficient level where noise does not seriously affect it, the smaller transducer signal is demodulated from the larger carrier signal.

Figure 10:
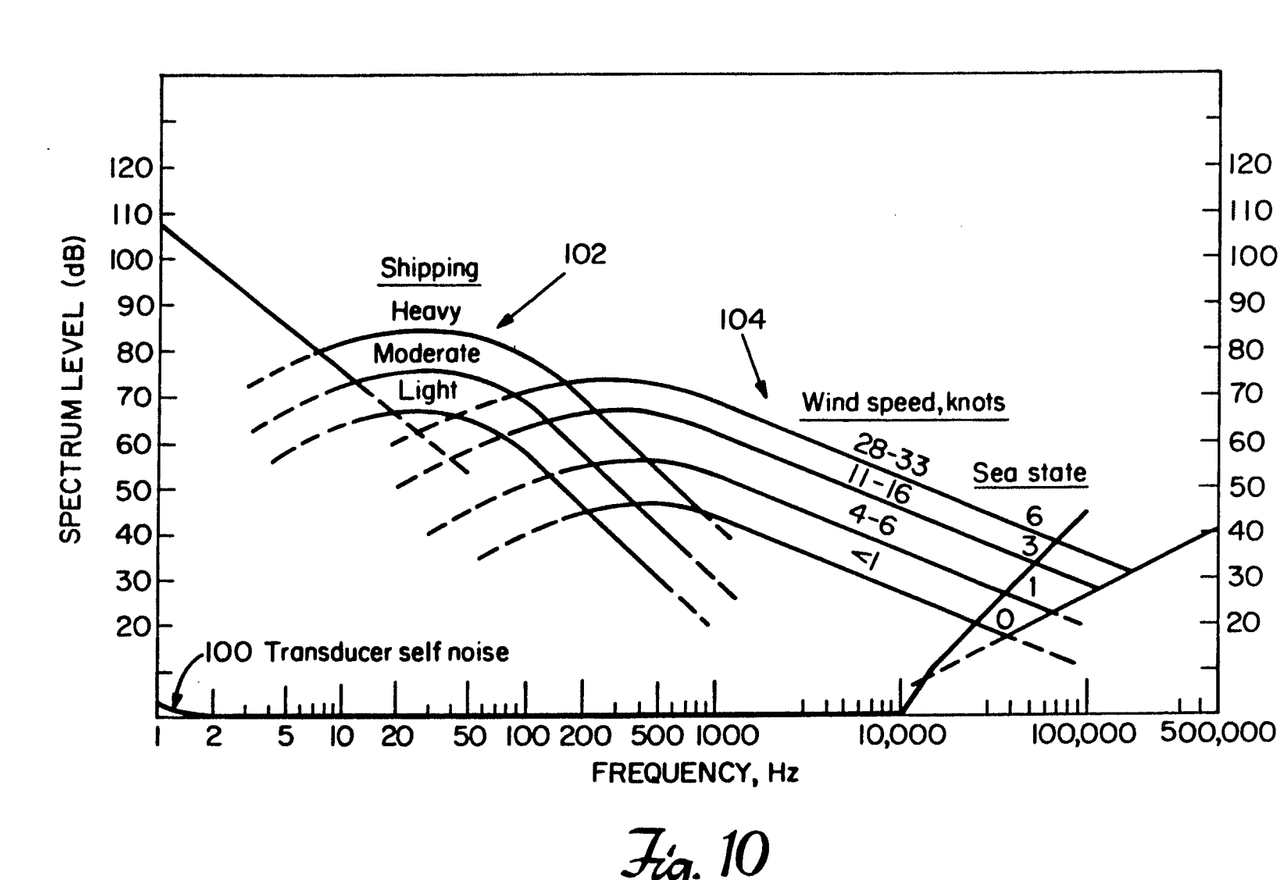
FIG. 10 is a graph showing the variation in noise levels of various background ocean noises as compared to the transducer self-noise.

The effectiveness of the transducer according to this invention can be seen with reference to FIG. 10, where the transducer self-noise 100 is shown to be negligibly low, up to 10,000 Hz or more, while the background sea noises from heavy, moderate and light shipping, curves 102, and the ambient sea noise from wind speed 104 of various velocities, are well above the transducer self-noise 100.

Figure 11:
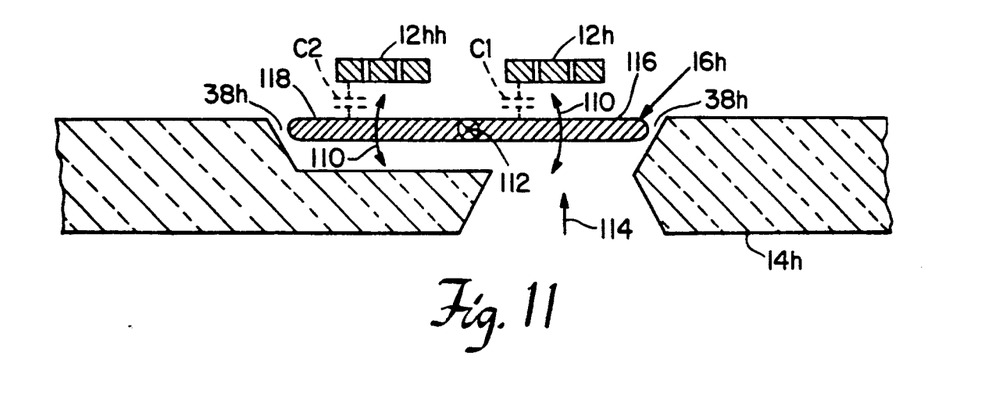
FIG. 11 is a schematic side sectional view of an acoustic transducer according to this invention in which the movable plate rotates instead of translates in response to incident acoustic wave energy.
Figure 12:
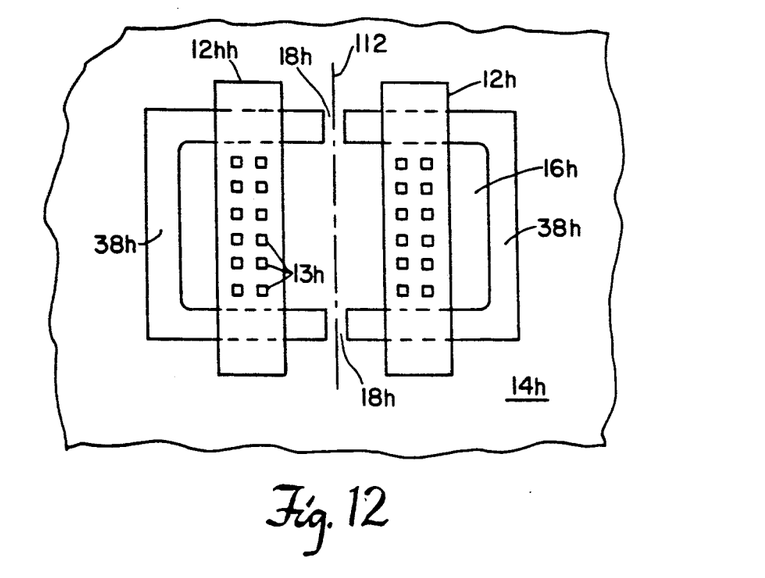
FIG. 12 is a top view of the device of FIG. 11.
Figure 13:
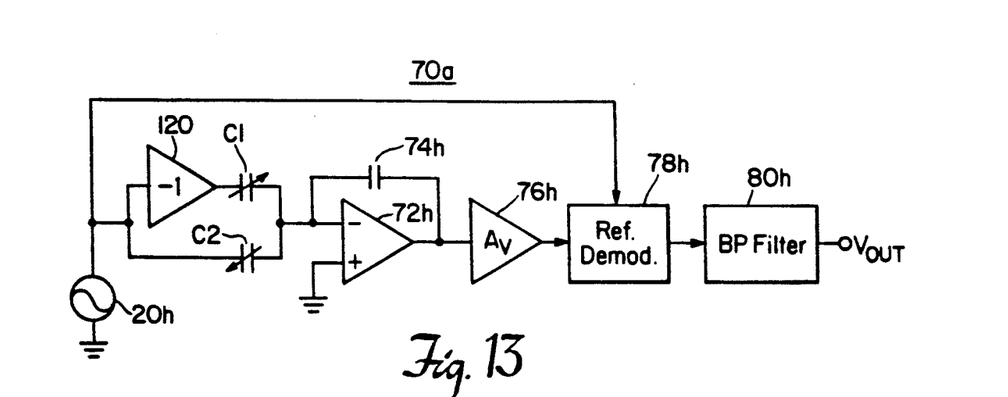
FIG. 13 is a schematic block diagram of a detection circuit for use with the acoustic transducer of FIGS. 11 and 12.

Although the embodiment thus far shows movable plate 16 movable relative to perforated plate 12 through translational motion, this is not necessarily a limitation of the invention, for as shown in FIGS. 11, 12, movable plate 16h may be configured to rotate about axis 112 as shown by arrows 110. Incident acoustic wave energy, arrow 114, rocks movable plate 16h in FIG. 11 so that right side 116 comes closer to perforated plate 12h while its other side 118 moves farther away from perforated plate 12hh. This complementary action can be used to increase the magnitude of the sensing signal. Axis 112 may extend through springs 18h, which extend from movable plate 16h to the support 14h across slot 38h. The movable plate 16h and springs 18h together form a lever which can be used to transform the acoustic impedance of the sound wave to match the transducer. By placing the capacitance C1, FIG. 13, associated with perforated plate 12h in parallel with capacitance C2 associated with perforated plate 12hh in detection circuit 70a, and using an inverting amplifier 120 to invert the output from signal generator 20h to one of those capacitors, e.g., C1 in FIG. 13, a differential output is provided to amplifier 72h. The output signal of this parallel circuit is treated similarly as it was with respect to circuit 70, FIG. 8, to provide the final amplified output signal representative of the incident acoustic wave energy.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An acoustic transducer comprising:
perforated plate means;
movable capacitor plate spaced from said perforated plate means;
spring means interconnecting said movable plate means and said perforated plate means for movably supporting said movable capacitor plate means relative to said perforated plate means;
said perforated plate, movable plate and spring means made from a silicon wafer, and said perforated plate, movable plate, and spring means forming a unified monolithic structure;
a dielectric fluid in the space between said movable and perforated plate means; and
means for applying an electric field across said movable and perforated plate means for producing an output signal representative of the variation in capacitance induced by the variation of the space between the plates in response to an incident acoustic signal.

2. The acoustic transducer of claim 1, wherein said movable plate and spring means are made from a silicon wafer using micromachining photolithographic process.

3. The acoustic transducer of claim 1, wherein said movable plate and spring means are made from a silicon wafer using micromachining photolithographic techniques.

4. The acoustic transducer of claim 1 in which said perforations constitute approximately thirty percent or more of said perforated plate means.

5. The acoustic transducer of claim 1 in which said perforations are holes.

6. The acoustic transducer of claim 1 in which said perforations are slots.

7. The acoustic transducer of claim 1 in which said dielectric fluid is a gaseous medium.

8. The acoustic transducer of claim 7 in which said gaseous medium is air.

9. The acoustic transducer of claim 1 in which said dielectric fluid is a liquid.

10. The acoustic transducer of claim 1 in which said dielectric fluid has a specific gravity matched to that of said movable plate means to minimize errors due to motion of the plate in response to acceleration forces.

11. The acoustic transducer of claim 1 in which said monolithic structure includes a chamber, said chamber has an opening, said movable and perforated plate means are disposed across said opening with one of said movable and perforated plate means facing into said chamber and the other facing out.

12. The acoustic transducer of claim 11 in which said chamber is filled with the same dielectric fluid as is present in the space between said plate means.

13. The acoustic transducer of claim 1 in which said movable plate means moves translationally relative to said perforated plate means.

14. The acoustic transducer of claim 11 in which said movable plate means moves rotationally relative to said perforated plate means.

15. The acoustic transducer of claim 1 further including a second perforated plate means on the opposite side of said movable plate means from the first said perforated plate means and spaced from said movable plate means with dielectric fluid between them, said movable plate means, spring means and both first and second perforated plate means forming a unified, monolithic structure.

16. The acoustic transducer of claim 15 in which said means for applying an electric field applies an electric field across said second perforated plate means and said movable plate means.

17. The acoustic transducer of claim 16 in which said means for applying an electric field applies an electric field of one polarity to the first said perforated plate means and of the opposite polarity to the second said perforated plate means.

18. The acoustic transducer of claim 1 in which said movable plate means is held at a virtual ground.

19. The acoustic transducer of claim 17 in which said movable plate means is held at a virtual ground.

20. The acoustic transducer of claim 11 further including a flexible membrane covering the plate means facing out of said chamber.

21. The acoustic transducer of claim 1 in which said movable plate means includes a pressure equalization path through the plate interconnecting its opposite faces.

22. The acoustic transducer of claim 21 in which said path includes a perimetrical slot.

23. The acoustic transducer of claim 21 in which said perforated plate means includes strain relief means.

24. The acoustic transducer of claim 23 in which said strain relief means are slots.

25. The acoustic transducer of claim 1 in which said means for applying an electric field includes a local oscillator circuit for providing a carrier wave across said plate means, means for ampllifying said carrier wave modulated by the variations introduced by variations in the space between said plate means, means for demodulating said carrier wave to obtain the modulating variations in spacing of said plate means representative of the change in capacitance effected by incident acoustic wave energy.

26. The acoustic transducer of claim 1, in which said movable plate, spring and perforated plate means are made from a silicon wafer.

27. The acoustic transducer of claim 15, in which said movable plate means, spring means and said first and second perforated plate means are made from a silicon wafer.

28. The acoustic transducer of claim 1, in which said means for applying an electric field across said movable and perforated plate means includes circuitry integrated into said silicon wafer.

29. The acoustic transducer of claim 26, wherein said movable plate, spring and perforated plate means are made from a silicon wafer using micromachining photolithographic process.

30. The acoustic transducer of claim 27, wherein said movable plate means, spring means and first and second perforated plate means are made from a silicon wafer using micromachining photolithographic process.

* * * * *